United States Patent

[11] 3,618,590

[72] Inventors Ulrich Anton Frank
Yardley;
Jerome Julius Freundlich, Morrisville, both of Pa.
[21] Appl. No. 837,289
[22] Filed June 27, 1969
[45] Patented Nov. 9, 1971
[73] Assignee Hoffmann-La Roche Inc.
Nutley, N.J.

[54] THERMAL ELECTRIC DENTAL PULP TESTER
5 Claims, 5 Drawing Figs.

[52] U.S. Cl. 128/2 R, 62/3, 128/303.1, 128/399
[51] Int. Cl. A61b10/00, A61b 19/00
[50] Field of Search 128/2, 303.1, 399–403, 172.1; 62/3

[56] References Cited

UNITED STATES PATENTS

| | | | |
|---|---|---|---|
| 2,200,321 | 5/1940 | Angell | 128/303.1 X |
| 3,093,135 | 6/1963 | Hirschhorn | 128/303.1 X |
| 3,133,539 | 5/1964 | Eidus | 128/399 |
| 3,146,600 | 9/1964 | Cox | 62/3 |
| 3,207,159 | 9/1965 | Tateisi | 128/303.1 |
| 3,274,995 | 9/1966 | Eidus | 128/2 |
| 3,283,520 | 11/1966 | Donohue et al. | 62/3 |
| 3,289,749 | 12/1966 | Crump | 62/3 X |
| 3,369,549 | 2/1968 | Armao | 128/303.1 |
| 3,400,543 | 9/1968 | Ross | 62/3 |
| 3,502,080 | 3/1970 | Hirschhorn | 128/303.1 |

*Primary Examiner*—Richard A. Gaudet
*Assistant Examiner*—Kyle L. Howell
*Attorneys*—Samuel L. Welt, Jon S. Saxe, Bernard S. Leon and Jacob Frank

ABSTRACT: A thermoelectric probe for applying heat or cold to a localized area of a body for medical treatment comprising a thermoelectric module mounted in thermal conductive contact with a heat transfer unit including a honeycomblike assembly for maximizing conduction of heat from the module, and a heat exchange system including a pair of concentric tubular units connected to one side of the honeycomblike unit. One of the tubular units is coupled at its remaining end to an air suction pump for drawing ambient air through the honeycomblike unit.

THERMAL ELECTRIC DENTAL PULP TESTER

BACKGROUND OF THE INVENTION

1. Field of the Invention

This invention relates broadly to thermoelectric devices and more particularly to a thermoelectric probe designed for localized heating and cooling in external or internal medical treatment particularly dental.

2. Description of the Prior Art

Many procedures in the medical art call for localized cooling or heating, especially the fields of diagnostics, therapeutics, and surgery. Thermoelectric devices, utilizing the Peltier effect have, in some instances, been known to be used for such purposes, however, the utility of these thermoelectric devices for medical applications has, in many cases, been limited by the need of complex and voluminous heat exchange systems and heat sinks especially when ambient air is employed as the heat exchange medium. These are necessary as the cooling effect of a Peltier module can only be exploited over a long treatment period when the heat-dissipating capacity of the heat exchange system, at the hot side of the module, is large enough to transfer heat at a sufficient rate. It should be understood, of course, that this is also essentially true for the reverse condition where the Peltier module is used to produce heat, but as a practical matter is by far less enigmatical than the problem of cooling.

SUMMARY OF THE INVENTION

The purpose of the present invention is, therefore, to provide a thermoelectric probe for medical treatment, which utilizes the Peltier effect to heat and/or cool a small localized area of the body, such as a tooth or gum line, by providing and efficient and compact heat exchange system. This is accomplished by employing a specially designed multiapertured heat transfer unit for conducting heat from the Peltier unit and using an air suction effect to draw ambient air, as a heat exchange medium, through the heat transfer unit. The heat exchange system is designed to also function as a probe handle, which is maintained at room temperature.

Other objects, advantages and capabilities of the present invention will become apparent from the following detailed description taken in conjunction with the accompanying drawing showing a preferred embodiment of the invention.

DESCRIPTION OF A PREFERRED EMBODIMENT

Figure 1:
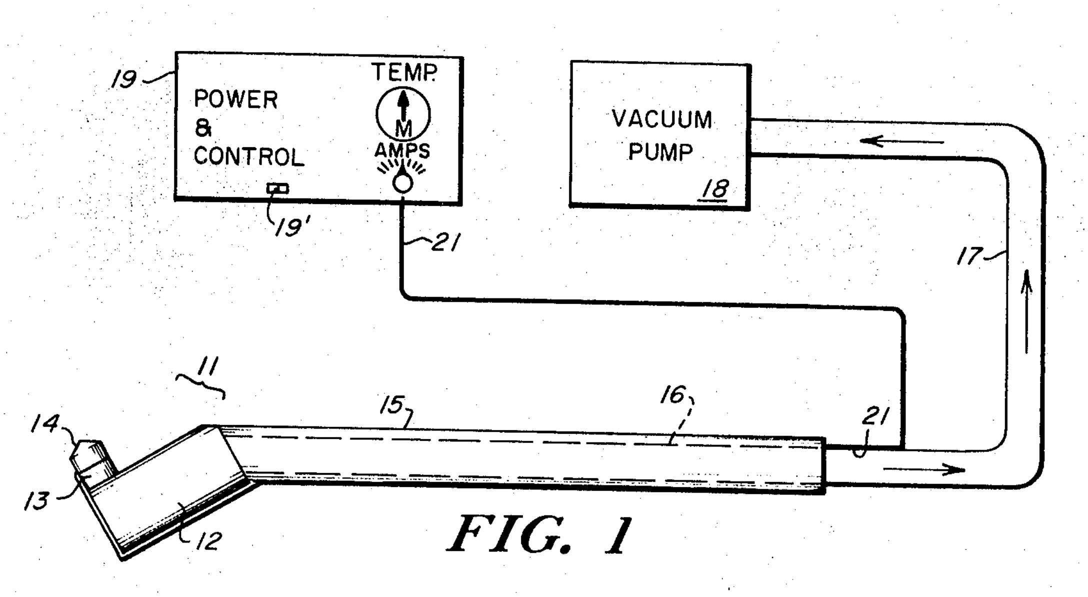
FIG. 1 shows a side elevation view of a thermoelectric probe according to the present invention.

Referring to the drawings, there is shown in FIG. 1, a thermoelectric probe having a cylindrical head assembly generally designated as 11 comprising a cylindricallike member 12 supporting at one end a thermoplastic unit including Peltier module 13 and body contact tip 14. Head assembly 11 is secured to a handle 15 of elongated tubular configuration which contains a second elongated tubularlike unit 16 emerging out at one end of the handle to be connected by way of a flexible conduit 17 to a conventional vacuum pump 18. A power and control unit 19 is connected to the thermoelectric unit by way of a cable 21 for setting and regulating the desired temperature at the body contact tip. As illustrated, head 11 and handle 15 are secured to each other at an inclined angle of about 150° convenient for application of contact tip 14 to various portions of the body.

Figure 2:
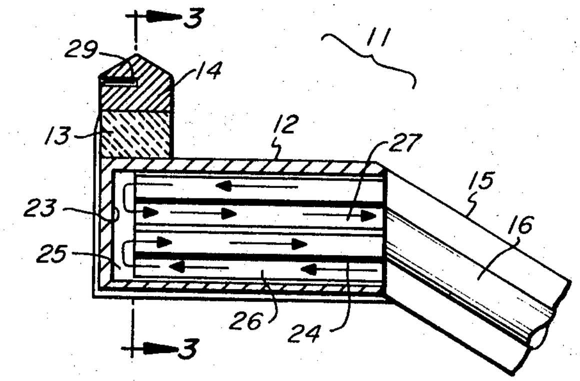
FIG. 2 depicts a longitudinal cross section view of the probe head assembly.
Figure 3:
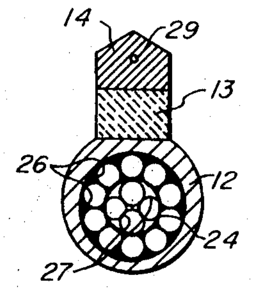
FIG. 3 illustrates a cross section along line 3—3 of FIG. 2.

Head assembly 11 is illustrated in greater detail in FIGS. 2 and 3 wherein cylindricallike member 12 is closed at one end 23 and has an eccentric crescent shaped cross section, which may be best observed with reference to FIG. 3, having about one side of its periphery a thick wall and on the opposite side a thin wall with a continuous transition in between, The outer surface of the thick wall is slightly flattened to form a plane surface upon which Peltier module 13 is seated. The open end of cylindrical member 12 is secured such as by welding to a handle 15 of elongated tubular configuration.

Positioned within cylindrical member 12 about its central axis is a shell-like unit 24 having a length dimension terminating just short of cylinder end 23, to define a chamber area 25 beneath part of the thermoelectric module. As shown, shell 24 has a diameter about half of that of cylindrical member 12. Between cylindrical member 12 and shell 24 are a series of elongated passageways comprising tubes 26 of matching diameter which are fixed by soldering or other suitable means thereby centrally locating shell 24. The hollow interior of shell 24 contains another bundle of tubes 27. Both tube sets 26 and 27, which together define a honeycomblike configuration, are of the same length as shell 24 and their axes are in parallel with the axis of shell 24. The tubular unit 16 within handle 15 is fixed such as by welding in end to end relation with shell 24. The material throughout the entire head assembly 11 including cylindrical member 12, shell 24, and tube sets 26, 27 is preferably highly thermal conductive such as copper suitably plated for bodily contact.

Figure 4:
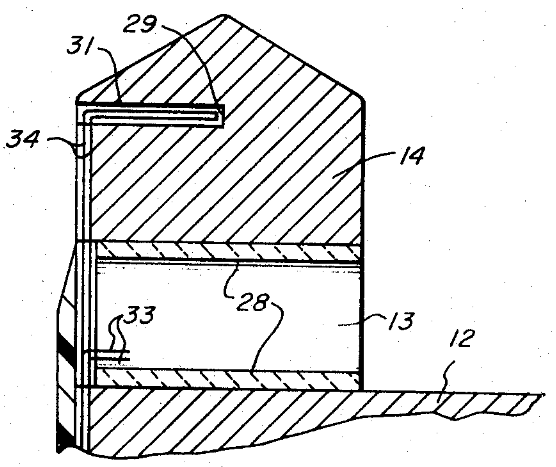
FIG. 4 is an enlarged cross section detailed view of a portion of the head assembly including the contact tip and Peltier module.

The thermoelectric module forming a part of the present invention is illustrated in FIG. 4, wherein the Peltier module 13 employed is a commercially available unit having a number of cascaded piles constructed of a material such as a quaternary alloy of bismuth, tellurium, selenium and antimony with small amounts of suitable dopends. The cascaded piles are sandwiched between a pair of flat alumina plates 28 providing high electrical insulation and high thermal conductivity. One ceramic plate of the Peltier module 13 is soldered for effective thermal contact to the flat top of cylindrical member 12. The opposite ceramic plate supports the body contact tip 14 having a conically shaped top portion, and fabricated of or plated with a highly thermal conductive material such as brass or copper. At the upper portion of contact tip 14 is a borehole 29 terminating approximately at the tip axis to serve as a housing for a thermocouple thermistor 31 or other temperature sensing probe used to measure and thereby control the temperature at contact tip 14.

Figure 5:
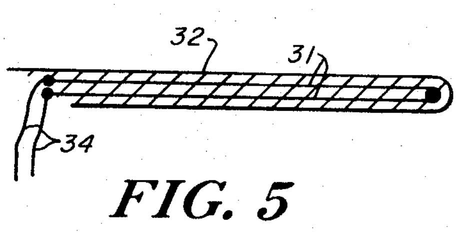
FIG. 5 is an enlarged cross-sectional view of the temperature measuring and grounding arrangement associated with the contact tip.

As pictured in FIG. 5, the thermocouple 31 (e.g., copper-constantan) is covered with an electrically conductive sheath 32, and is electrically insulated from the sheath by an alumina of other suitable filling. The sheath 32, electrically connected with the contact tip 14, is grounded at the cylindrical member 12, The thermocouple wires 34 and the current supply leads 33 for the Peltier module, are combined to form a single cable 21 which runs across the end face of the head assembly 11 to the power and control unit 19, as described above. Over the face end of head assembly 11 is moulded a plastic to enclose the wiring, and in the case of using the probe as a dental tool to exclude debris from the Peltier module.

MODE OF OPERATION OF THE PREFERRED EMBODIMENT

In operation of the embodiment shown in FIGS. 1 through 5, the power and control unit 19 is turned on to deliver a DC current via cable 21 and lead 33 to the Peltier unit in a direction to cause cooling of the ceramic plate 28 adjacent contact tip 14, whereby the ceramic plate mounted on cylindrical member 12 is heated. The heat generated at plate 28 is conducted for optimum heat distribution to a heat transfer unit including the wall of cylindrical member 12 to the material-forming tubes 26, shell 24 and tubes 27. Within the head assembly 11, at the surface of the various members of the heat transfer unit, the heat exchange operation takes place to dissipate the heat generated. The latter is accomplished by the suction pump 18, which, when turned on, cause ambient air to be drawn in through tubular handle 15, as indicated by the arrows, through and between tubes 26 to chamber 25 above which Peltier module 13 is mounted, and from there through and along the bundle of tubes 27 in shell 24 to be evacuated through concentric tube 16 to which suction pump is secured.

Use of a suction air pump for heat exchange was found to be highly desirable, as opposed to other methods, for the function described above. For example, in initially using a forced air system, it was found that the airflow was slightly heated by the compression and compressor prior to being directed in contact with the heat transfer unit, thus reducing the heat exchange efficiency. Also, measures were necessary to rout off heated air so as not to bother either the patient or operator. On the other hand, by use of the air suction system, ambient air temperature is hardly affected prior to coming into contact with the heat transfer unit, and, in addition, the handle which functions as part of the heat exchange unit, is always maintained at room temperature.

In order to attain the proper heating or cooling temperature at the contact tip, a dial is ser at the desired temperature on the temperature meter M at power and control unit 19, and the current is controlled to maintain the desired temperature. A switch 19' is available to provide for reversal of the current through the Peltier unit for selectively heating or cooling the contact tip.

It should be understood, of course, that the foregoing disclosure relates only to one preferred embodiment of the invention. Numerous modifications of the mechanical arrangement are possible without departure from the principle of the invention. For example, the honeycomb feature of the heat transfer unit consisting of a multiplicity of tubes could be replaced by an extruded head unit to form a single integral piece. Further, the tube sets 26, 27, could take on other configurations such as radial fins or an "S" shape.

We claim:

1. A thermoelectric probe for applying heat or cold to a locaalized are of a body for medical treatment comprising, heat transfer including a thermally conductive member defining a chamberlike area having first and second openings where the second opening encircles the first opening thermoelectric means mounted in thermal conductive contact with said heat transfer means, current source means electrically connected with said thermoplastic means, first and second duct means mounted in sleevelike fashion and each having one of their ends respectively connected to said first and second openings heat exchange means including a suction pump coupled to the other end of said first duct unit and the other end of said second duct unit being open to the surrounding atmosphere, to draw a directed flow of ambient air by way of the second of said duct units into heat exchange relationship with said heat transfer means whereby the second one of said duct units function as a handle for the probe during its use.

2. A thermoelectric probe according to claim 1 wherein said thermally conductive member is cylindricallike member closed at one end and having an eccentric shape cross section with the higher volume of material at an area adjacent the thermoelectric means.

3. A thermoelectric probe according to claim 2 wherein said heat transfer means further includes a thermally conductive shell contained within said cylindrical member and secured in end-to-end relationship with said first duct unit, and a first set of thermally conductive radial means positioned within said shell and a second set of thermally conductive radial means positioned between the cylindrical member and said shell.

4. A thermoelectric probe according to claim 3 wherein the open end of said cylindrical member is secured in end-to-end relationship with the second of said duct units.

5. A thermoelectric probe according to claim 4 whereby said first and second sets of radial means are of tubular configuration.

* * * * *

UNITED STATES PATENT OFFICE
CERTIFICATE OF CORRECTION

Patent No. 3,618,590 Dated November 9, 1971

Inventor(s) Ulrich Anton Frank and Jerome Julius Freundlich

It is certified that error appears in the above-identified patent and that said Letters Patent are hereby corrected as shown below:

Column 3, line 38 of claim 1 "locaalized"

should be localized

Column 3, line 39 of claim 1 "heat transfer including"

should be heat transfer means including

Column 4, lines 6-7 of claim 1 "thermoplastic"

should be thermoelectric

Column 4, line 20 of claim 2 "member is cylindricallike"

should be member is a cylindrical-like

Signed and sealed this 25th day of April 1972.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O—366-334